United States Patent [19]
Wolfington et al.

[11] Patent Number: 5,195,393
[45] Date of Patent: Mar. 23, 1993

[54] BRAIDED MECHANICAL CONTROL CABLE

[75] Inventors: Dan D. Wolfington, Modesto; Gregory A. Giesea, San Jose, both of Calif.

[73] Assignee: Cherokee Cable Company, Inc., Modesto, Calif.

[21] Appl. No.: 533,111

[22] Filed: Jun. 4, 1990

[51] Int. Cl.⁵ ............................. F16C 1/20; F16D 1/12
[52] U.S. Cl. ...................... 74/502.5; 74/502.4; 74/502.6; 403/165; 403/78; 403/134; 403/201; 174/110 PM
[58] Field of Search ............................ 74/501.5–502.6; 403/194, 201, 238, 265, 38, 164, 165, 78, 57, 58; 174/110 PM

[56] References Cited

U.S. PATENT DOCUMENTS

| | | | |
|---|---|---|---|
| 1,743,506 | 1/1930 | Watson et al. | 74/502.5 |
| 2,218,903 | 10/1940 | Bratz | 74/502.5 |
| 2,573,361 | 10/1951 | Rodgers et al. | 74/502.5 |
| 3,063,303 | 11/1962 | Cadwallader | 74/502.5 |
| 3,177,901 | 4/1965 | Pierce | 74/502.5 |
| 3,183,301 | 5/1965 | Kompanek et al. | 74/502.5 |
| 3,238,808 | 3/1966 | Barnard | 74/502.5 |
| 3,242,691 | 3/1966 | Robinson et al. | 74/502.5 |
| 3,350,959 | 11/1967 | Machate | 74/502.5 |
| 3,373,632 | 3/1968 | Jeromson et al. | 74/501.5 R |
| 3,745,231 | 7/1973 | Eager et al. | 174/110 PM |
| 3,764,779 | 10/1973 | Kadoya et al. | 219/201 |
| 4,045,611 | 8/1977 | Torgerson | 174/110 PM |
| 4,704,044 | 11/1987 | Yoshigai | 403/165 X |

FOREIGN PATENT DOCUMENTS

| | | | |
|---|---|---|---|
| 1254110 | 5/1989 | Canada | 74/502.5 |
| 0228112 | 10/1986 | Japan | 74/502.5 |
| 1506193 | 9/1989 | U.S.S.R. | 74/502.5 |

Primary Examiner—Vinh T. Luong
Attorney, Agent, or Firm—Michael J. Hughes

[57] ABSTRACT

A braided inner cable (10) for a mechanical control cable assembly (36) having a construction which provides for the use of fibers (14), (22) and (24) which are arranged in a three layer construction in which an inner longitudinal fiber core (12) is bound within a second braided fiber layer (16). A final pressure extruded outer jacket layer (30) surrounds the braided fiber layer (16), and permeates any spaces therebetween. The resulting inner control cable (10) is of a size and shape to fit standard commercially available outer cable housings (34). The inventive inner control cable (10) is intended to be used in applications such as for clutch cables on motorcycles and control cables on bicycles. Standard prior art ferrules (40), are installed on the inventive cable (10) by means of an epoxy adhesive (41).

1 Claim, 5 Drawing Sheets

BRAIDED MECHANICAL CONTROL CABLE

TECHNICAL FIELD

The present invention relates generally to mechanical control devices and more particularly to mechanical cable type control assemblies.

BACKGROUND ART

The predominant current usage of the improved mechanical control cable of the present invention is as a replacement for conventional mechanical control cables in various devices including motorized machinery and motor vehicles. Mechanical cable control assemblies are a well known means of transmitting mechanical position information from a controlling device to a controlled device. Such control cable assemblies consist, in general, of an inner control cable and an outer control housing. The inner control cable has traditionally been made of either a single steel wire, or of strands of steel wire twisted together to form a cable. The outer cable housing is frequently constructed by coiling steel wire to form a tube such that the inner control cable can be slidably inserted into the outer cable housing tube. This outer cable housing is then frequently covered (sheathed) with a plastic type material.

The principle of operation of such mechanical cable control assemblies is well understood in the field. The outer cable housing is fixed at its opposite ends. The action of pulling a given amount of the inner control cable from the outer control cable housing at the controlling end results in a like amount of inner control cable being pulled into the outer cable housing at the control end. It should be noted that many mechanical control cable applications require transmittal of control position information in only one direction. Such applications include those wherein the controlled device returns to a normal position by means of a spring or other tensioning mechanism, when mechanical force is removed from the controlling end of the cable. In these applications, the outer cable housing need only be prevented from movement in one direction relative to the length of the cable assembly, and the inner control cable is only subjected to a pulling force from the controlling end. However, there are applications which require both a pushing and a pulling force from the controlling end. These latter applications, of course, require that the outer cable housing be fixed at both ends so as to prevent movement in either direction along its length. A third type of application requires that the cable transmit rotational mechanical position information. An example of this last type of application is the driving of mechanical speedometers and tachometers.

Mechanical control cable assemblies are used primarily as substitutes for rigid control rods, and the like, where either mechanical position information is required to be transmitted around turns or obstructions, or where the relative positions of the controller and the controlled device are not fixed. Therefore, it is necessary that both the outer cable housing and the inner control cable be flexible. However, It is also necessary that both the outer cable housing and the inner control cable be of a fixed length and neither easily stretchable nor compressible along the length dimension. In order to accomplish this combination of necessary qualities, the materials used in the construction of the inner control cable have been engineered so as to provide a minimum required degree of flexibility, while also resisting dimensional distortion. But, unfortunately, an ideal steel or other metallic material for this purpose can not be produced using any known technology. Repeated flexing of an inner steel control cable results in stress failure. Repeated pulling on an inner steel control cable results in stretching. Furthermore, a property of the steel that has been developed for this purpose is that it is flexible only within very restricted limits. If such steel is bent beyond these limits, it will kink or remain bent even after the bending force is removed. This results in an inner control cable that is either totally useless or severely reduced in its usefulness.

Another problem with steel inner control cables is that they require lubrication in order to slide smoothly within their outer cable housings. Such lubrication is also necessary to prevent an unacceptable wear factor between the components. However, lubricants trap dust and grit from the atmosphere which, eventually, actually contribute to increased wear. Lubricants also become stiff during cold weather and, therefore, inhibit proper operation of the device. Also, since devices which incorporate mechanical control cable assemblies are frequently exposed to the weather, moisture may be introduced inside the outer cable housing. This moisture results in the additional problems of rusting and of freezing during cold weather. This last problem has been specifically address by the invention described in U.S. Pat. No. 3,764,779 issued to Kadoya et. al, wherein heating elements are introduced into a mechanical cable control assembly to prevent freezing.

Clearly, an inner control cable which would be more resistant to stretching, which would be more resistant to kinking, which would be more resistant to stress failure under extended operation, which would not require lubrication and therefore would avoid the problems associated therewith, and which could be used to replace existing mechanical inner control cables, would be desirable. Synthetic materials have been developed which inherently have some of these properties. For instance, synthetic materials which are stronger per unit diameter than steel, and which resist stretching better than steel, are now available. Some of these same materials are also considerably more flexible than steel, and therefore inherently resist kinking and damage from excessive flexing better than steel. However, these materials have been found to be lacking in other properties necessary for their use in the construction of mechanical control cables. For instance, such materials are frequently quite susceptible to fraying and other damage caused by abrasion. Furthermore, the materials in question individually lack the resistance to compression along their length which is inherent in steel cable, and they are too prone to lateral expansion and compression to be useful in any prior art construction as mechanical control cable materials.

One material which possesses many of the qualities described above is an aramid fiber manufactured and sold by the DuPont Corporation under the name Kevlar TM. Kevlar fibers has been used as reinforcing material in many applications such as in automobile tires, in high pressure hoses, and in conveyor belts. Kevlar fibers have also been used as a reinforcing material in electrical cable and ropes, wherein its flexibility and resistance to stretching and corrosion have all been important qualities. However, none of these applications have required that the Kevlar TM fibers resist abrasion. In fact, Kevlar TM fibers are not inherently rugged in the respect that they will not readily withstand abrasion without damage. Further, none of these applications has required that the combined unsupported Kevlar TM fibers resist compression along their length. In fact, while Kevlar TM fibers are inherently resistant to stretching, they have little resistance to compressive forces along their length, since their flexibility will cause them to bend back upon themselves when subjected to longitudinal compressive forces. Furthermore, none of these applications has required the Kevlar TM fibers, or bundles of Kevlar TM fibers, to resist expansion or contraction across their diameter. While this is an important characteristic for mechanical control cables, it is not a characteristic of bundles of Kevlar TM fibers that have been created using prior technology.

Obviously, it would be desirable to incorporate the advantages of resistance to stretching and breaking, flexibility, and unit strength per diameter, which are all inherent in these synthetic fiber materials, into mechanical control cable constructions. However, prior art methods for combining these fibers have not provided the cross sectional integrity or resistance to abrasion necessary to make the fibers useful for this important purpose. No prior art construction, to the inventors' knowledge, has successfully provided a way to incorporate the advantages of modern nonmetallic materials into the construction of inner mechanical control cables. All successful mechanical control cables to date have used either a single steel wire or a twisted steel alloy wire cable as the inner control cable. Such steel inner control cables have suffered from a tendency to fail under repeated stress, a tendency to stretch, a tendency to corrode, severe limitations on flexibility, and a need for lubrication and the inherent disadvantages associated therewith.

DISCLOSURE OF INVENTION

Accordingly, it is an object of present invention to provide a mechanical control cable which is resistant to stretching, breaking, and corrosion.

It is another object of the present invention to provide a mechanical control cable which does not require lubrication.

It is a further object of the present invention to provide a mechanical control cable which is well suited for use in adverse conditions, such as cold weather or dusty environments.

It is still another object of the present invention to provide a means for mechanically transmitting physical control position information economically and reliably.

This invention relates to a mechanical control cable assembly having a conventional outer cable housing, but being provided with an inner control cable having a unique three layer construction. The present invention is particularly adapted for any use in which conventional mechanical control cables are utilized, and extends the range of useful applications for mechanical control cables into applications for which such cables heretofore have been deemed unsuitable.

Briefly, the preferred embodiment of the present invention is an inner control cable for a mechanical control cable assembly having an inner core of synthetic fiber running the length of the cable. The inner core of lengthwise synthetic fibers is compressed and stabilized in its cross-sectional configuration by a braided casing of synthetic fibers. An outer covering of an appropriate material is then molded over the synthetic fibers to prevent abrasion of the fibers and to further stabilize the shape of the combination. At each end of the control cable a fitting is rigidly affixed for attaching the cable to a control lever, knob, or the like at one end, and to the controlled mechanism at the other.

Since it is anticipated that the present invention will be useful in a wide variety of size configurations, it is not intended that the scope herein be limited to a particular size cable. However, since the inventors have found minor variations in the construction of the invention as disclosed herein to be advantageous, it is thought that the invention will be best disclosed by describing the constructions of the three different sizes of cable which the inventors believe to be the best presently known embodiments of the invention.

Briefly, the first presently preferred embodiment of the invention is a 2.5 millimeter diameter cable having a core made up of five strands of 1420 denier aramid fiber, a braided layer made up of eight strands of 1420 denier aramid fiber, and an outer jacket. A second equally preferred embodiment of the invention is a 1.5 millimeter cable having a core made of two strands of 1420 denier aramid fiber and one strand of 380 denier aramid fiber, a braided layer of 4 strands of 380 denier aramid fiber and eight strands of 195 denier aramid fiber, and an outer jacket. A third equally preferred embodiment of the invention is a 2.0 millimeter cable having a core of 4 strands of 1420 denier aramid fiber and 1 strand of 380 denier aramid fiber, and a braided layer of 12 strands of 380 denier aramid fiber, and an outer jacket.

All three equally preferred embodiments of the invention are provided with metallic end terminals affixed to the cable by means of an epoxy adhesive. Since conventional means for affixing end terminals, such as brazing and crimping, will not work with the inventive cable, an epoxy bonding agent is used to affix the end terminals.

It is an advantage of the present invention that the improved mechanical control cable is resistant to stretching and breaking.

It is another advantage of the present invention that the improved mechanical control cable is flexible, and therefore is not prone to kinking and stress failure problems.

It is yet another advantage of the present invention that the improved mechanical control cable requires no lubrication, and therefore will not attract abrasive grit from its environment, nor will it fail to operate due to freezing of the lubricant in cold weather.

A further advantage of the present invention is that the improved mechanical control cable remains flexible and strong throughout a wide temperature range.

It is yet another advantage of the present invention that the improved mechanical control cable is resistant to most corrosive agents.

It is still another advantage of the present invention that the improved mechanical control cable is light in weight.

It is yet another advantage of the present invention that the improved mechanical control cable can easily be used to replace conventional mechanical control cables.

These and other objects and advantages of the present invention will become clear to those skilled in the art in view of the description of the best presently known modes of carrying out the invention, and the industrial applicability of the preferred embodiments as described herein, and illustrated in the several figures of the drawings.

BEST MODE FOR CARRYING OUT INVENTION

The best presently known mode for carrying out the invention is a cable wherein an inner core of longitudinally placed fibers is bonded by a surrounding braided layer of fibers and the braided layer is covered by a pressure extruded outer jacket layer. The predominant expected usage of the inventive mechanical control cables is in the motor vehicle industry, particularly in the manufacture of two and four wheeled, one or two passenger sport vehicles wherein durability, simplicity, light weight, and resistance to damage from exposure to the elements is most desirable. While it is anticipated that the inventive cables will find application in machinery including automobiles, boats, and stationary machines, the first usage is expected to be on motorcycles and bicycles.

Figure 1:
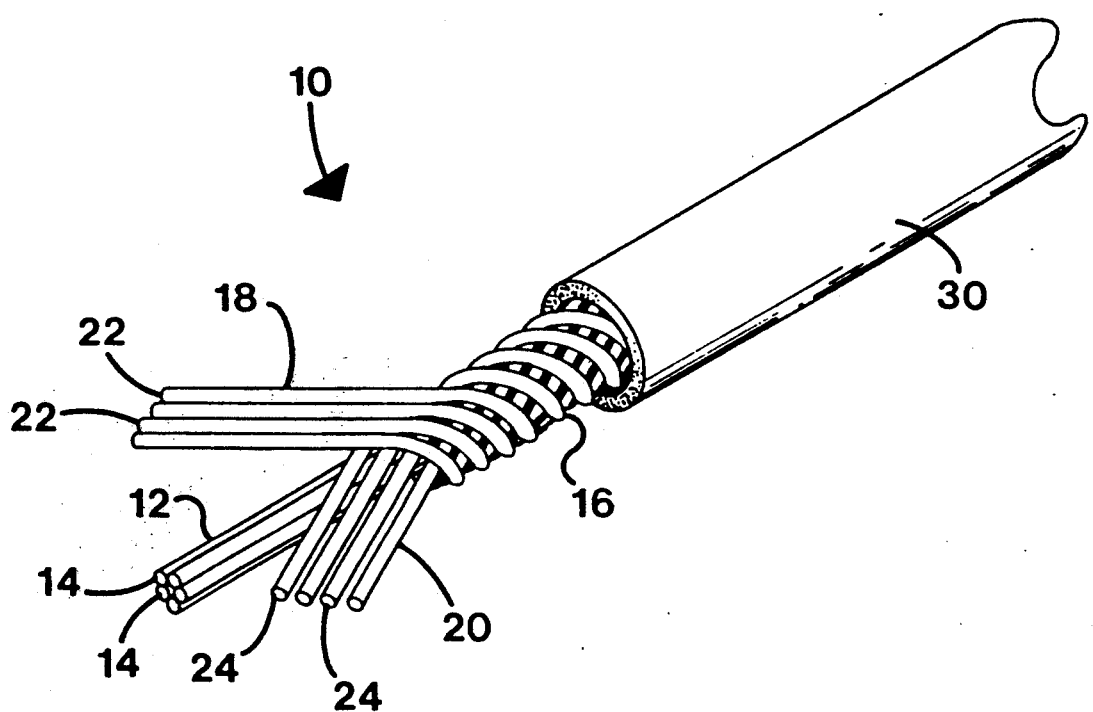
FIG. 1 is a perspective view of the first presently preferred embodiment of an inner mechanical control cable according to the present invention showing the arrangement of braided fibers therein.
Figure 2:
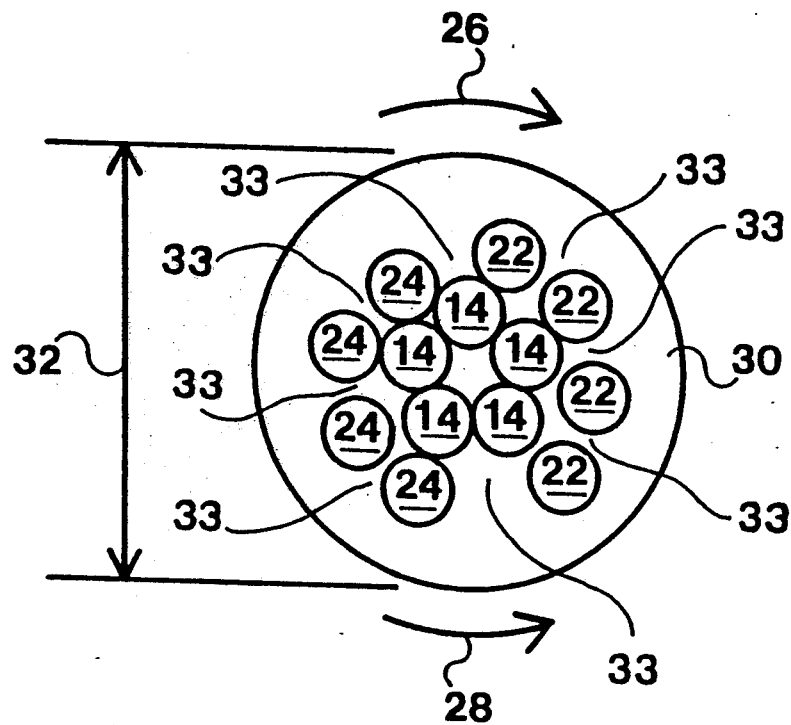
FIG. 2 is an end view of the first presently preferred embodiment of an inner mechanical control cable according to the present invention.
Figure 3:
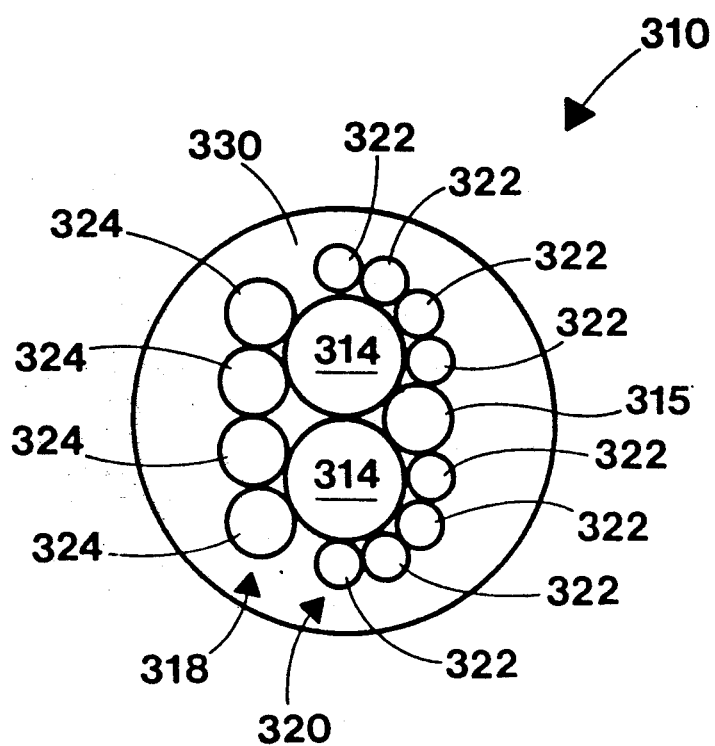
FIG. 3 is an end view of the second presently preferred embodiment of an inner mechanical control cable according to the present invention.
Figure 4:
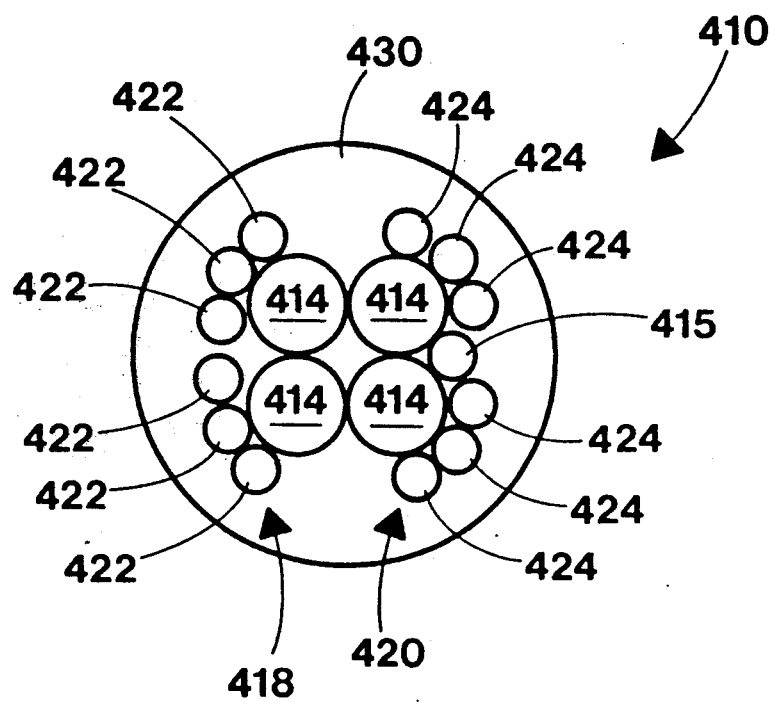
FIG. 4 is an end view of the third presently preferred embodiment of an inner mechanical control cable according to the present invention.

The inner mechanical control cable of the first presently preferred embodiment of the present invention is illustrated in a perspective view in FIG. 1 and is designated therein by the general reference character 10. A cross sectional view of the inventive cable 10 is shown in FIG. 2, and cross sectional views of the second preferred embodiment 310 and the third preferred embodiment 410 are shown in FIG. 3 and FIG. 4, respectively.

In the preferred embodiment 10, a longitudinal fiber core 12 is formed using five individual longitudinal fibers 14 each of size 1420 denier. The individual longitudinal fibers 14 are bundled in the core 12 lengthwise and do not cross each other along their length. A braided bonding layer 16 is then constructed from a top carrier 18 and a bottom carrier 20. In the first presently preferred embodiment of the invention, the top carrier 18 is made up of four individual top carrier fibers 22, each of size 1420 denier, and the bottom carrier 20 is made up of four individual bottom carrier fibers 24, also each of size 1420 denier. The top carrier fibers 22 and the bottom carrier fibers 24 are arranged in rows so that the fibers 22 and 24 can be wrapped in the form of a flat band around the longitudinal core 12, as depicted in FIG. 1.

In the first presently preferred embodiment 10 of the invention, as in all embodiments of the invention disclosed herein, the individual longitudinal fibers 14, the top carrier fibers 22, and the bottom carrier fibers 24 are all strands of DuPont Kevlar brand aramid fiber, although the invention could be practiced with any nonmetallic fiber having similar characteristics, particularly, any polymer material having parallel chain-extending bonds from each aromatic nucleus. In the best presently known embodiments of the invention, KEVLAR 49 TM fiber is used. However, the inventor has found that KEVLAR 29 TM fiber could also be applied to the purpose. In fact, it is believed that KEVLAR 49 TM fiber is actually approximately 5 times stronger than necessary for the purpose, and that KEVLAR 29 provides a more economical alternative while retaining more than sufficient strength to provide an adequate safety margin.

Techniques and equipment for braiding fibers such as are used in the construction of the present invention are well known and widely practiced, having been developed for purposes such as braiding insulation shielding around coaxially constructed electrical wires. According to these existing techniques, the bottom carrier 20 is wound in a spiral fashion around the longitudinal core 12 in a direction nominally designated as clockwise 26 (FIG. 2), while the top carrier 18 is wound in a spiral fashion in a direction nominally designated as counterclockwise 28 as the longitudinal core 12 is drawn past the winding area. As can be appreciated from the above description, the top carrier 18 will cross either over or under the bottom carrier 20 twice in each complete wrap around the core 12. In order to form a braid, the top carrier 12 is passed over and under the bottom carrier 20 on alternating cross overs (that is, once over and once under on each wrap).

In the first presently preferred embodiment 10 of the invention, the core 12 is advanced 11.8 mm (0.465 inch) per revolution of the top carrier 18 and the bottom carrier 20.

As stated previously, the actual technique used to accomplish this braiding is not unique to the invention, and it is not intended that the invention be limited to a particular braiding technique, since the resulting construction should be essentially the same no matter what technique is used. By way of example, one technique that may be used is to have the bottom carrier 20 fed from a stationary location while the longitudinal core 12 is rotated as it is fed past the bottom carrier 20. Using this technique, the top carrier 18 is fed from a mechanism (not shown) which rotates around the longitudinal core 12 in a direction opposite to the direction of rotation of the longitudinal core 12 and at a rate of revolution identical to that of the longer core 12 relative to a fixed reference point (or twice that of the rate of rotation of the longitudinal core 12 relative to the rotational axis of the longitudinal core 12 itself).

The primary purposes of the braided bonding layer 16 are to lend some rigidity to the core 12, and to provide resistance to twisting, bending back upon itself, and changing of the cross sectional shape of the cable 10. In order to accomplish these goals, the bonding layer 16 must be wrapped sufficiently tightly to hold the core fibers 14 in place, and yet not so tightly as to cause the top carrier fibers 22 or the bottom carrier fibers 24 to deform or cut into the longitudinal fibers 14. While the inventors have found that there is a wide window of acceptable wrapping tensions, it has been found that a tension of from about one (1) lb. (4.45 N.) to three (3) lbs. (13.35 N.) is most desirable. The longitudinal fiber core 12 is also kept under about one (1) lb. (4.45 N.) to three (3) lbs. (13.35 N.) of tension during the wrapping process.

An outer jacket layer 30 is pressure extruded in a continuous extrusion process around the braided bonding layer 16. Pressure extrusion of a jacket layer around a central core is a practice well known in the industry, and is not unique to the present invention. One skilled in the art will be thoroughly familiar with the process based upon the following brief description: An extrudate material is delivered from a hopper to an extrusion die tip. The die is heated to approximately 410° F. and the delivery area is heated to approximately 340° F. The core material is drawn through the center of the extrusion die as the extrudate material is applied evenly thereon in a continuous manner.

Figure 5:
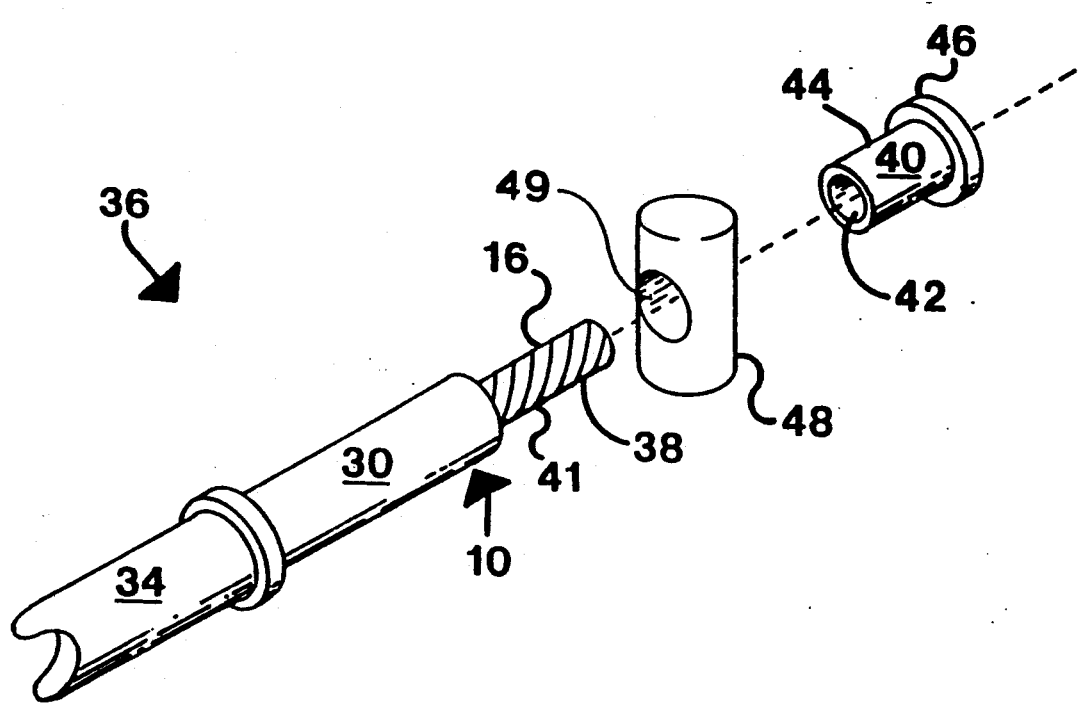
FIG. 5 is an exploded perspective view of a portion of a mechanical control cable assembly utilizing the inner cable of the present invention.

As can be seen more clearly in the detail of FIG. 2, the jacket layer 30 permeates any spaces 33 that may exist between the carrier fibers 22 and 24. This further helps to stabilize the shape of the cable 10. The outer diameter dimension 32 of the jacket layer 30 is deliberately that of conventional prior art cables, so as to make the inventive cable 10 usable with a prior art housing 34 (FIG. 5). In the case of the first presently preferred embodiment of the invention 10, the outside diameter 32 is 2.03 mm (0.080 inch).

The outer jacket 30 also protects the carrier fibers 22 and 24 from abrasion and provides a smooth outer surface for the cable 10, which forgoes any need for lubrication, the advantages of which have been previously disclosed herein.

The outer jacket 30 may be made from any of a number of materials, including polypropylene and surlyn TM plastic. In the presently preferred embodiment of the invention 10, the outer jacket 30 is made from polypropylene. Of course, it should be noted that, since the above described process for forming the cable 10 is a continuous process, the cable 10 can be cut to any length desired prior to accomplishing the remaining construction steps as described hereinafter.

Referring now to FIG. 5, wherein is shown an exploded perspective view of a mechanical control cable assembly 36 with the inner control cable 10 of the present invention inserted in the conventional housing 34, it can be seen that an end portion 38 of the braided bonding layer 16 has been exposed by removing a portion of the jacket layer 30 therefrom. An end ferrule 40 is slipped over the end portion 38 and is bonded in place by an epoxy adhesive 41. In the presently preferred embodiment of the invention 10, Socketfast TM adhesive (which is available from Philadelphia Resins Corp., 130 Commerce Drive, Mongtomeryville, Pa., 18936) is used, although any similar high quality adhesive should be adequate for the purpose.

The ferrule 40 is a standard part such as is used with prior art steel cables. Such standard part fittings are made of brass, although the material is not critical for use with the present invention, and any sufficiently rugged material could be used. The ferrule 40 has an aperture 42 which fits over the end portion 38 of the cable 10, a narrow portion 44 and a wide portion 46. The dimensions of the narrow portion 44 and the wide portion 46 are standardized in the industry to fit receptacles in various types of equipment with which the mechanical control cable assembly 36 might be used. If the mechanical control cable assembly 36 is to be used with a motorcycle clutch lever actuator, or the like, a lever pivot fitting 48 is introduced (on one end only) onto the cable before installing the ferrule 40, to provide a means to attach the cable 10 to a clutch handle lever (not shown). The lever pivot fitting 48, also, is a standard off-the-shelf part, and is not unique to the present invention.

If the inner cable 10 of the present invention is manufactured and sold as part of a preassembled mechanical control cable assembly 36, the ferrule 40 and the lever pivot fitting 48 may be installed at the factory. Alternatively, if the inner cable 10 is to be sold as a replacement for existing steel cables, the ferrule 40 and adhesive 41 could be supplied as a kit. Of course, ferrules 40 could not be preinstalled for use in replacement applications, since the inner cable 10 cannot be inserted in the housing 34 with the ferrules 40 installed. This same consideration exists concerning prior art steel cables. However, it is anticipated that the present inner cable 10 might be even more appropriate for such replacement applications because it does not require a special crimping tool or brazing equipment for installation of the ferrules 40.

A second equally preferred embodiment of the invention is depicted in FIG. 3, and is designated therein by the general reference character 310. General construction is very similar to that of the first preferred embodiment 10 (FIG. 1) and (FIG. 2), and the choice of materials remains the same. The second preferred embodiment 310 has a core 312 made of two large core fibers 314 (size 1420 denier), and one small core fiber 315 (size 380 denier). A braided bonding layer 316 including a top carrier 318 and a bottom carrier 320 is braided around the core 312 as described previously in connection with the first preferred embodiment of the invention 10. In the second preferred embodiment of the invention 310, the top carrier 318 is made of eight top carrier fibers 322, each of size 195 denier. The bottom carrier 320 is made of four strands of bottom carrier fibers 324, each of size 380 denier. The jacket layer 330 has an outside diameter of 1.57 mm (0.062 inch), again to conform to the diameter of a widely used prior art cable.

A third equally preferred embodiment of the invention is depicted in FIG. 4, and is designated therein by the general reference character 410. The third preferred embodiment 410 has a core 412 made of four large longitudinal core strands 414 each of size 1320 denier, and one small longitudinal core strand 415 of size 380 denier. As with the first preferred embodiment 10 and the second preferred embodiment 310, a braided bonding layer 416 including a top carrier 418 and a bottom carrier 420 is braided around the core 412. In the third preferred embodiment of the invention 410, the top carrier 418 is made of four top carrier fibers 422, each of size 380 denier. The bottom carrier 420 is made of eight strands of bottom carrier fibers 424, also each of size 380 denier. The jacket layer 430 of the third preferred embodiment 410 has an outside diameter of 2.08 mm (0.082 inch), once again in order to conform to the diameter of a widely used prior art cable. The general construction of the third embodiment 410 is very similar to that of the first preferred embodiment 10 and the second embodiment 310, and the choice of materials and employment of techniques used remains the same.

Ferrules 40 are installed on the second preferred embodiment 310, and on the third preferred embodiment 410 in the same manner as described previously in connection with the first preferred embodiment of the invention 10.

The inner mechanical control cables 10, 310, and 410 of the present invention are similar in external appearance to conventional inner control cables, and they are used in a similar fashion. However, the actual physical structure is very dissimilar to prior art cables, since prior art construction was not adaptable to take advantage of recently developed materials. The substantial difference between the inventive cables 10, 310, and 410 and prior art cables exists in the multi-layer construction which provides structural stability to the unit which is not inherent in the materials used.

The substantial differences between the inventive cables 10, 310, and 410 and prior art applications of the materials used to practice the invention exist in the aspects of the construction which provide for repeatedly sliding the materials through a housing while maintaining cross sectional shape and while resisting damage from abrasion, and for resisting compressive forces and torques.

Various modifications may be made to the invention without altering its value or scope. As discussed previously, it is anticipated that a great variety of sizes of the invention might be constructed, and the three sizes presented herein as the best presently known embodiments are intended to be exemplary of variations that might be employed to construct these different sizes. Similarly, the materials used in the best presently preferred embodiments as described herein are certainly not the only materials that could be used to practice the invention, and it is anticipated that various similar materials might be employed, including materials which may not yet have been developed.

Another obvious change would be to use more carriers than two in the braiding process.

All of the above are only some of the examples of available embodiments of the present invention. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

INDUSTRIAL APPLICABILITY

Mechanical control cables are widely used in the manufacture of complex machines, particularly in the manufacture of motor vehicles such as tractors, automobiles, and motorcycles. The predominant current usage is for actuating mechanisms such as clutches on motorcycles.

The inner mechanical control cables of the present invention may be utilized in any application wherein conventional inner mechanical control cables are used. Furthermore, the inventive cables have been found to be useful in applications wherein mechanical control cables have been found to be less than well suited. For instance, control cables incorporating the inventive inner cables have been projected to be useful for speedometer cables in power boats. The inventive inner cables have been found to withstand the repeated severe flexing to which such cables are subjected and have been found to hold up well under exposure to salt water, which features prior art steel cables were found to lack.

Since the inner control cables of the present invention may be readily constructed and are physically significantly similar to prior art conventional inner cables, it is expected that they will be acceptable in the industry as substitutes for conventional inner cables. In fact, it is anticipated that the unique advantages of the present invention may greatly extend the number and types of applications for which mechanical control cables are deemed to be the most reliable and cost effective means of control. For these and other reasons, it is expected that the utility and industrial applicability of the invention will be both significant in scope and long-lasting in duration.

We claim:

1. An inner cable for a mechanical control cable assembly, comprising:

an inner core including a plurality of longitudinal strands running generally parallel to each other;

a binding layer including a plurality of binding strands for binding the longitudinal strands together such that the longitudinal strands are maintained generally parallel to each other, the binding strands being spirally wrapped around said inner core; and a jacket layer surrounding the binding layer said jacket having an outer diameter sized to slidably fit within the mechanical control cable housing, and further being formed so as to permeate any spaces between the binding strands such that the binding strands tend to be held in position relative to each other by said jacket layer;

an end terminal adapted for attaching the inner cable to an external mechanical device, the end terminal including a generally solid cylindrical lever pivot fitting having an aperture therethrough, the inner cable being inserted through the aperture, and a ferrule rigidly affixed to an end of the inner cable such that the lever pivot fitting is prevented from moving past the ferrule and off of the inner cable, the ferrule being affixed to the end of the inner cable by an epoxy adhesive; wherein said jacket layer is formed of polypropylene.

* * * * *